United States Patent

Chen et al.

[11] Patent Number: 5,914,811
[45] Date of Patent: Jun. 22, 1999

[54] BIREFRINGENT GRATING POLARIZING BEAM SPLITTER

[75] Inventors: Yansong Chen, Houston, Tex.; Shangquiq Liu, Beijing, China; Alex Ignatiev; NaiJuan Wu, both of Houston, Tex.

[73] Assignee: University of Houston, Houston, Tex.

[21] Appl. No.: 08/706,309

[22] Filed: Aug. 30, 1996

[51] Int. Cl.$^6$ ............................. G02B 5/30; G02B 5/18
[52] U.S. Cl. .................... 359/495; 359/494; 359/569; 359/571
[58] Field of Search .................... 359/485, 486, 359/487, 494, 495, 497, 500, 565, 569, 571

[56] References Cited

U.S. PATENT DOCUMENTS

| | | |
|---|---|---|
| 4,895,790 | 1/1990 | Swanson et al. . |
| 4,915,463 | 4/1990 | Barbee, Jr. ............................ 359/571 |
| 5,029,988 | 7/1991 | Urino . |
| 5,073,007 | 12/1991 | Kedmi et al. ......................... 359/571 |
| 5,085,496 | 2/1992 | Yoshida et al. ....................... 359/485 |
| 5,245,471 | 9/1993 | Iwatsuka et al. ..................... 359/494 |
| 5,537,252 | 7/1996 | Rauch .................................. 359/571 |
| 5,659,531 | 8/1997 | Ono et al. ............................. 359/495 |
| 5,682,266 | 10/1997 | Meyers ................................. 359/571 |

FOREIGN PATENT DOCUMENTS 0 349 144 A2  6/1989  European Pat. Off. .

OTHER PUBLICATIONS

Kathman et al; "Binary Optics: New Diffractive Elements for the Designer's Tool Kit"; *Photonics Spectra*; Sep. 1992; pp. 125–129.

*Handbook of Optics* vol. II, Second Ed., McGraw–Hill, Inc. pp. 3.1–3.70.

Chen, Yansong, et al., "Design of Diffractive Optical Elements for Implementing Optical Interconnects and Beam Splitting," *Chinese Physical Society*, vol. 12, No. 5 (1995), pp. 457–460.

Gale, M.T. et al., "Continuous–relief diffractive optical elements for two–dimensional array generation," *Applied Optics*, vol. 32, No. 14, May 10, 1993., pp. 2526–2533.

Hutley, M.C., *Diffraction Gratings*, Brace Javanovich Publishers, 1982, pp. 20–41.

Walker, S.J., et al., "Design and fabrication of high–efficiency beam splitters and beam deflectors for integrated planar micro–optic systems," *Applied Optics*, vol. 32, No. 14, May 10, 1993, pp. 2494–2501.

*Primary Examiner*—Ricky D. Shafer
*Attorney, Agent, or Firm*—Baker & Botts, L.L.P.

[57] ABSTRACT

A birefringence polarizing beam-splitter is provided. A series of periodic blazed grooves or grooves with echelon profile having a number of steps is provided on the surface of an optically birefringent material. The birefringent substrate material may be crystalline or plastic. In another embodiment, two substrates of birefringent material having a series of periodic blazed grooves or grooves with echelon profile are combined to achieve greater angle of beam splitting.

14 Claims, 2 Drawing Sheets

BIREFRINGENT GRATING POLARIZING BEAM SPLITTER

FIELD OF THE INVENTION

This invention relates to a type of optical polarizer. More particularly, a birefringent diffraction grating polarizing beam splitter is provided.

BACKGROUND OF THE INVENTION

A polarizing beam splitter is an element by which incident light is split into two components, the extraordinary ray (e-ray) and the ordinary ray (o-ray) with their polarization directions perpendicular to each other and with the e-ray and o-ray emerging from the beam splitter along two directions. Such an element is widely used as a component in optical fiber communications, liquid crystal displays, optical disc systems, and other optical systems.

Conventional polarizing beam-splitters such as the polarizing prisms employ the effect of birefringence only. They are described, for example, in Handbook of Optics, Vol. II, pp. 3.19–3.26 (1995). Although prisms have high extinction ratios, high transmittance, and high optical damage thresholds, a large amount of birefringent crystal with fine optical quality must be utilized as the raw material to make them; otherwise, their aperture or beam splitting angle will be severely limited. As a result, they are large, heavy, and relatively expensive.

Another type of polarizer is a birefringence diffraction grating-type polarizer (European patent, No. 0349144 A2). In this type of polarizer, periodic proton ion-exchanged regions are provided on the principal plane surface of an optically anisotropic crystal substrate to provide an optical diffraction grating, and a dielectric layer is provided on each of the periodic proton ion-exchanged regions. The refractive index of the dielectric layer is a approximately equal to that of the crystal substrate, and the whole surface of the optical diffraction grating is covered by an anti-reflection layer of a single material having a uniform thickness. The polarizer can split a parallel incident beam into a diffracted beam of zero-order with the direction of polarization along the x-axis and a series of plus- and minus-order diffracted beams with direction of polarization along the y-axis. Because one of two polarization components of the incident light beam is diffracted into plus- and minus-orders, these polarization beams propagate in many directions. Therefore, this kind of polarizer is an imperfect polarizing beam splitter.

A polarizing beam splitter for use with monochromatic light or monochromatic long-wavelength radiation or polychromatic light is needed which can: provide a high extinction ratio with almost complete separation of the pure polarized e-ray and o-ray; provide a high transmittance, or negligible absorption; be made in thin sheet-form; have high optical damage threshold; provide the possibility of a large beam-splitting angle; be produced in quantity at low cost, especially if made from plastic and produced by replication techniques; and, be made with a large aperture and in any desired shape if formed from optical plastics.

SUMMARY OF THE INVENTION

In one embodiment of a birefringence polarizing beam splitter, a series of periodic blazed grooves with an M-step echelon profile (where M is an integer larger than 2) is fabricated on the surface of an optical birefringent substrate. The substrate may be a birefringent crystal such as calcite or a birefringent optical plastic. In another embodiment, a series of blazed grooves with a sawtooth profile is fabricated on the surface of an optical birefringent substrate. In yet another embodiment, two such substrates are placed so that the grooves form small composite prisms which are separated by a material having a selected index of refraction.

BRIEF DESCRIPTION OF THE DRAWINGS

The features and advantages of the present invention will be apparent from the written description and the drawings in which.

DESCRIPTION OF PREFERRED EMBODIMENTS

Figure 1:
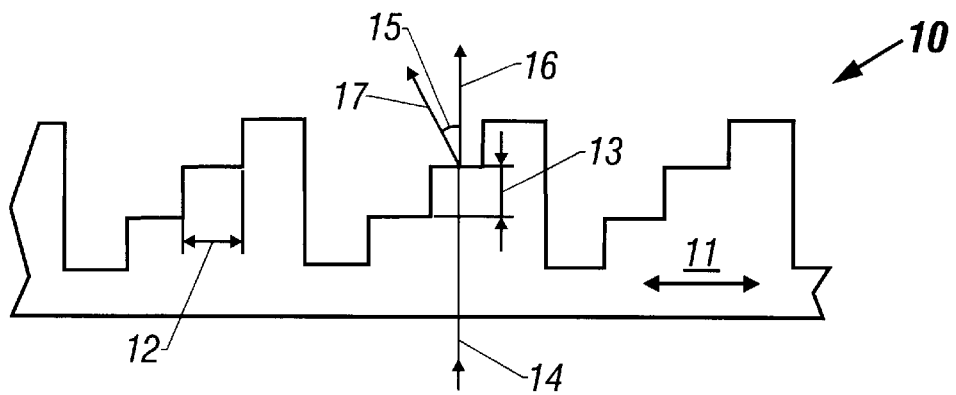
FIG. 1 is a schematic diagram of a birefringent polarizing beam splitter of this invention having periodic blazed grooves with M-step echelon profile.

Before describing the birefringence polarizing beam splitter of this invention, its principle of operation will be briefly explained.

A birefringent polarizing beam splitter having periodic blazed grooves forms a special type of transmission blazed grating. For an ordinary transmission blazed grating, its diffraction can be regarded as the combined effect of single slit diffraction and multiple beam interference, so that one can redirect an incident light beam in the designed direction. The book Diffraction Gratings, by M. C. Hutley, pp. 21–40 (1982) describes such gratings. The working mechanism of the periodic blazed grooves of the polarizers in accordance with the invention is a little more complicated than the ordinary gratings.

For the birefringence polarizing beam splitter that has a periodic M-step echelon groove profile, its diffraction is determined by combining the single slit diffraction of each step in an echelon and the multiple beam interference caused by the N echelons. Each echelon of this grating may be regarded as a tiny echelon grating; it diffracts an incident light beam into a certain diffracted angular distribution. Because the refractive indexes of e-rays and o-rays are different in the birefringent substrate, the diffracted angular distributions of e-rays and o-rays are different. Moreover the efficiencies of various diffracted orders caused by the multiple beam interference of N echelons are also different for the e-rays and o-rays. Thus, by suitably adjusting the parameters of the polarizer structure, primarily the grating structure of this echelon and adjustment of its step width and step height, a type of special grating polarizer can be made such that only one diffracted order remains for each of the emerging o-rays and e-rays. As a result, the incident light beam can be separated into only two polarized beams, which can travel along two different directions with the directions of polarization perpendicular to each other.

For the birefringence polarizing beam splitter that has a periodic triangle groove profile, the diffracted distribution is determined by the combined effect of the single slit diffraction of each triangle groove and the multiple beam interference caused by N triangle grooves. In fact, each triangle groove of the grating is a tiny prism. In geometrical optics it will redirect an incident light beam into a refractive direction, which depends on the index of the substrate medium. Therefore, for the birefringence polarizing beam splitter the diffracted angular distributions of emerging e-rays and o-rays are different because of their different indices, and thus the efficiencies of various diffracted orders, caused by multiple beam interference of the N triangle grooves, are also different for an e-ray and an o-ray. As a result of this triangle grating structure and by controlling its blazing angle so it is not too small, such a special grating polarizer can be designed so that only one diffracted order remains for each of the emerging e-rays and o-rays, with different emerging angles.

Referring to FIG. 1, birefringence grating polarizer 10 having a periodic M-step echelon groove profile is shown. Substrate material 11 is a birefringent material. Each echelon consists of M steps. Each step having a width d and height h (denoted by 12 and 13 in FIG. 1, respectively). The value of d is preferably in the range from about 0.1 micrometer to about 800 micrometer and the step height is preferably in the range from about 0.1- to about 10-times the wavelength of the incident radiation to be split. The optical axis of the substrate medium is in the plane of the paper and horizontal, as indicated by the double-pointed arrows in FIG. 1.

Parallel light beam 14, with wavelength $\lambda$ is incident on and normal to the back side of grating 10, passes through the medium and arrives at the interface of an echelon profile. For the two rays emerging from two neighboring steps in an echelon there is an optical path difference:

$$\Delta = nh + n'd \sin \theta - n'h \cos \theta, \quad (1)$$

where n is the refractive index of the substrate medium (taking value $n_o$ for the o-ray, and $n_e$ for the e-ray), n' is the refractive index of the medium outside the substrate (such as the air), and $\theta$ is the emerging angle of the ray (denoted by 15 in FIG. 1). To simplify the discussion, the incident angle of the beam has been taken to be zero (the incident light beam is normal to the back side of the grating). Substituting $\Delta = m\lambda$ into expression (1), the echelon grating equation is deduced, $$m\lambda = nh + n'd \sin \theta_m - n'h \cos \theta_m, \quad (2)$$

where $\theta_m$ is the diffracted angle of the $m_{th}$ diffracted principal maxima caused by the multiple beam interference of M steps in an echelon. Because the refractive indexes of the substrate medium for the e-ray and o-ray are different, the diffracted angles $\theta_m$ form the e-ray and o-ray are also different according to Eq. (2).

According to optical scalar diffraction, we have the composite intensity of the emerging o-ray or e-ray from this type of grating (*Diffraction Gratings*, M. C. Hutley, Academic Press, 1982, pp. 21–40):

$$I = I_i[(\sin \alpha)/\alpha]^2 [(\sin M\beta)/(\sin \beta)]^2 [(\sin N\gamma)/(\sin \gamma)]^2,$$

$$\alpha = (\pi n'd/\lambda) \sin \theta,$$

$$\beta = (\pi/\lambda)(nh + n'd \sin \theta - n'h \cos \theta),$$

$$\gamma = (\pi n'Md/\lambda) \sin \theta, \quad (3)$$

where $I_i$ is the original intensity of each of the two polarization components in the incident light beam, N is the number of echelons participating in the interference, the factor $[(\sin \alpha)/\alpha]^2$ is the single-slit diffraction term caused by each step, $[(\sin M\beta)/(\sin \beta)]^2$ is the multiple-beam interference term caused by M steps in each echelon, and $[(\sin N\gamma)/(\sin \gamma)]^2$ is the multiple-beam interference term caused by N echelons. The overall period D of the echelon (D=Md=4d in FIG. 1) determines the positions of various principal maxima caused by the multiple beam interference of N echelons, and the geometric parameters of the echelon and its refractive index determine the intensities of these diffracted principal maxima. Because the polarizer has an echelon structure, by adjusting the structure parameters suitably, such a polarizer can be designed so that only one diffracted order remains for each of the emerging e-rays and o-rays, but with different emerging angles. More specifically, most all of the light energy is concentrated in one principal order for each of the e-rays and o-rays, and all other harmonic orders are very small. The larger the number M is, the greater the light energy concentrated in the principal order. In general M may be taken from 3 to 32 because in an echelon M must be larger than 2 and fabrication is too difficult if M substantially more than about 32. In FIG. 1, M=4. The light beam, which is incident on the back side of polarizer 10 and passes through it, can be separated into two emerging beams with different emerging angles, and with polarization directions perpendicular to each other.

Figure 4:
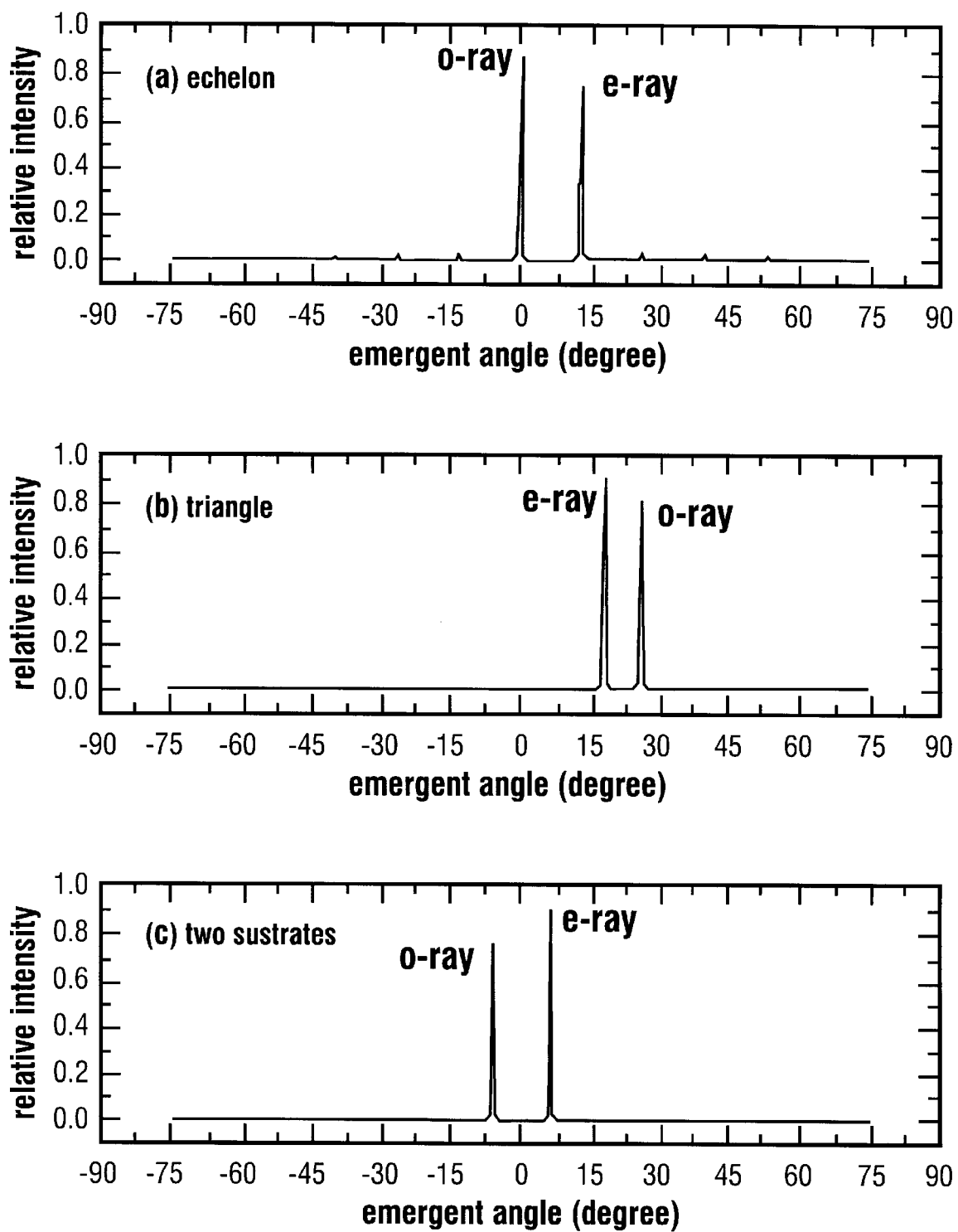
FIG. 4($a$), 4($b$) and 4($c$) show the results of calculations of relative intensity vs. angles of the emergent rays for the e-ray and o-ray of the three examples of this invention.

As an example, with calcite as the material of the polarizer, the refractive indexes for the e-ray and o-ray are $n_e = 1.486$ and $n_o = 1.658$, respectively. When taking the values of n'=1, d=0.7 $\mu$m, h=$\lambda/(n_o - n')$, $\lambda$=632.8 nm, M=4 and N=500 (the corresponding scale of the interference region is 1.4 mm, which is equal to the size of the incident beam on the polarizer), and substituting them into expression (3), the calculation results are shown in FIG. 4(a). FIG. 4(a) indicates that the energy of the emerging o-ray is concentrated in only one direction, at $\theta = 0°$, and that the energy of the emerging e-ray is concentrated in another direction, at $\theta = 13.3°$. The significant result is that all of other harmonic orders are almost absent: note the very small amplitude of the second-, third-, and fourth-order intensities relative to the first order intensity. Therefore, the beamsplitting angle $\theta$ (denoted by 15 in FIG. 1) between the emerging o-ray (denoted by 16 in FIG. 1) and e-ray (denoted by 17 in FIG. 1) is 13.3°.

Figure 2:
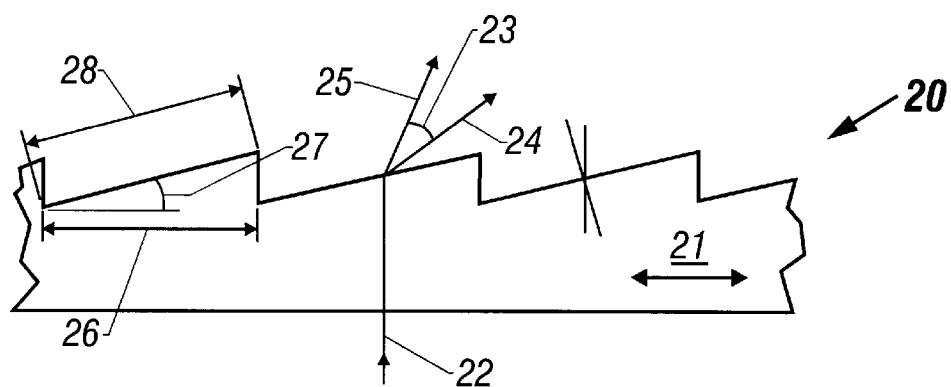
FIG. 2 is a schematic diagram of a birefringent polarizing beam splitter of this invention having periodic blazed grooves with triangle-shape profiles.

Referring to FIG. 2, birefringence grating polarizing beam splitter 20 having periodic triangle groove profile according to another embodiment of this invention is shown. Substrate material 21 is birefringent, as described above. The grating period is d (26), its blazed angle is $\theta_b$ (27), and the length of the long side (which corresponds to the diffraction slit) of the triangle is b (denoted by 28), which is equal to d/cos$\theta_b$. The optical axis of the substrate material 21 is indicated by double-pointed arrows in FIG. 2. Preferably, the grating period is from about 0.1 micrometer to about 800 micrometer. The blazed angle is preferably in the range from about 10° to about 50°.

Parallel light beam 22 with wavelength $\lambda$ incidents on the back side of this grating polarizer at incident angle $\theta_i$ (to simplify the discussion, $\theta_i$ has been taken to be 0° in FIG. 2), then passes through the medium and arrives at the interface of the triangular profile with the incident angle $\theta_i$ to the grating normal, and angle a to the triangle diffraction slit resulting in an e-ray (25) and an o-ray (24) emerging separated from the beam splitter. When the light passes through this interface boundary, the kth order of diffraction makes a diffracted emerging angle $\theta_k$ to the grating normal, and an angle $\beta$ to triangle diffraction slit. Again, according to optical scalar diffraction, the diffracted intensity for a transmission blazed grating can be expressed by (*Diffraction Gratings*, M. C. Hutley, Academic Press, 1982, pp. 21–40), $$I=I_i[(\sin U)/U]^2[(\sin NV)/(\sin V)]^2,$$

$$U=[(\pi b)/\lambda](n' \sin \beta - n \sin \alpha),$$

$$V=[(\pi d)/\lambda](n' \sin \theta_k - n \sin \theta_j),$$

$$\alpha = \theta_j + \theta_b,$$

$$\beta = \theta_k + \theta_b,$$

$$n' \sin \theta_i = n \sin \theta_j, \qquad (4)$$

where n is the refractive index of the substrate medium, $n_o$ and $n_e$ are the indexes for the o-ray and e-ray, respectively, n' is the refractive index of the medium outside the substrate (such as the air), $I_i$ (i=1, 2) is the original intensity of the polarization component for the incident light beam, N is the number of triangle slits in the grating, the factor $[(\sin U)/U]^2$ is the single slit diffraction term caused by an individual slit, and $[(\sin NV)/(\sin V)]^2$ is the multiple beam interference term caused by N slits.

It is clear that, because the refractive index of the substrate medium for e-rays and o-rays is different, the diffracted angle $\theta_k$ for the emerging e-ray and o-ray is different. Since this grating is a blazed grating, the o-ray component should be concentrated in one emerging direction, as is also the case for the e-ray component but with a different emerging angle. Therefore, an incident light beam can be separated into two polarized beams with different emerging directions.

As an example, for calcite as the polarizer material, and the values of n'=1, d=200λ, $\theta_b$=30°, $\theta_i$=0°, λ=632.8 nm, N=20 (the corresponding scale of the interference region in the polarizer is 2.5 mm) using Eq. (4), the calculation results, which are shown in FIG. 4(b), indicate that the emerging o-ray is concentrated in only one direction, and the emerging e-ray is in another direction. The predicted intensities of the higher orders are very small, not detectable on the plots of FIG. 4(b). The beam-splitting angle (denoted by 23) between the emerging o-ray (denoted by 24) and e-ray (denoted by 25) is 7.8°.

Figure 3:
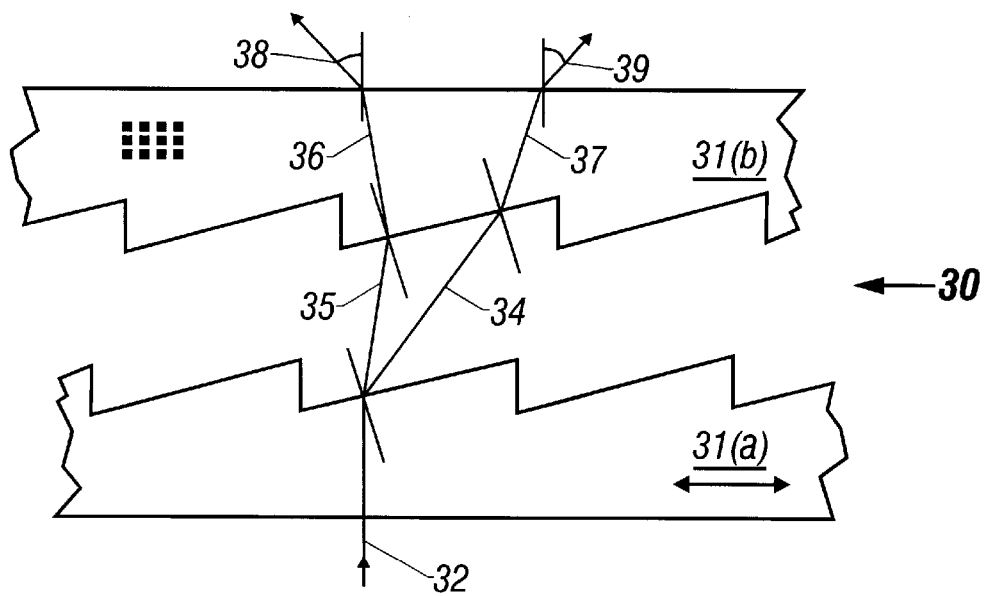
FIG. 3 is a schematic diagram of a birefringent polarizing beam splitter of this invention having two substrates, each having periodic blazed grooves with triangle-shaped profiles.

Birefringence grating polarizing beam splitter 30, composed of two substrates and having periodic right-angled triangle groove profile in yet another embodiment according to the invention, is shown in FIG. 3, where two birefringent substrates made of substrate materials 31(a) and 31(b) are placed in such way that the optical axes of substrate 31(a) and 31(b) are perpendicular to each other, and the optical axis of substrate 31(b) is perpendicular to the plane of the paper (denoted by dots). Such a polarizer with two blazed gratings placed in a face to face configuration is equivalent to a series of tiny Wollaston prisms. Two substrates are used so that the beam-splitting angle between the emerging e-ray and o-ray will be larger than when a single substrate is used.

For calcite as the material of the polarizer, and using the same parameters as used in the second embodiment to calculate the intensities of emerging e-ray and o-ray from the polarizer, the calculation was carried out in two steps. First, substituting the parameter values into expression (4) the emerging e-ray 35 and o-ray 34 are obtained from the first birefringent substrate 31(a) that are the same as those shown in FIG. 2. Second, the e-ray 35 and o-ray 34 become the o-ray 36 and e-ray 37 after entering substrate 31(b), and then the o-ray 36 and e-ray 37 are treated in a way similar to above, respectively. As the result, a parallel incident beam 32 is separated into two polarized beams by polarizer 30, which are o-ray 38 and e-ray 39. The calculation results are shown in FIG. 4(c), where the beam splitting angle between o-ray and e-ray is expanded to 12.4°.

If the blazed angles of the two gratings are larger, the beam splitting angle between the o-rays and e-rays will also be larger. In order to avoid total internal reflection from substrates 31(a) and 31(b), the space between the two substrates can be filled by a medium with the suitable refractive index $n_s$ ($n_e < n_s < n_o$), which makes each tiny composite unit between two substrates a cemented prism. Since each composite unit between two substrates is a tiny polarizing prism, many new types of polarizers with different performance characteristics can be made from the existing polarizing prisms, such as Glan-type prisms, Nicol-type prisms and Rochon-type prisms by changing combinations of substrate optical axes or changing angles of triangles similar to Glan-type, Nicol-type, Rochon-type, and so on.

The birefringence polarizing beam splitter embodying the invention can be made by photolithography and ion etching techniques or other known micomachining technology when using a birefringence crystal as the substrate. Such techniques are described and referenced, for example, in the paper "Design and fabrication of high-efficiency beam splitters and beam deflectors for integrated planar micro-optic systems," *Applied Optics*, pp. 2494–2501, (1993), which is incorporated herein by reference. The accuracy of dimensions of the polarizers must be in the range of tens of nanometers to obtain high performance polarized beams. When the parameter d of the polarizer is as large as tens or hundreds of microns, which relates to deeper grooves at the grating surface, the polarizer can be made by optical and mechanical precision manufacture. In this case, because the grating period and groove depth are larger, the requirement of the manufacturing accuracy may be lower.

If optical birefringence plastics are used as the substrate of the polarizers, the master pattern of the polarizer can be first fabricated by the method mentioned above, and then the master pattern can be duplicated by pressing the birefringence polarizers in the plastic substrate. This replication technique is also referenced for example, in the paper "Continuous-relief diffractive optical elements for two-dimensional array generation," *Applied Optics*, pp. 2526–2533, (1993), which is incorporated herein by reference.

A birefringence polarizing beam splitter composed of one or two birefringent crystals or plastic substrates with the periodic echelon or triangle groove profile will have a very high extinction ratio because of complete separation of the polarized e-ray and o-ray and the very high ratio of incoming power into first order rays. The transmittance of the polarizer will be high because absorption will be negligible in the thin birefringent media. The optical damage threshold can be high, particularly if a crystal is employed as the medium. A preferred crystal is calcite, but other known birefringent crystals may be used.

The beamsplitting angle can be large, especially by using a periodic M-step echelon groove profile with a narrow step width, or by using two substrates with a periodic triangle groove profile and large blazed angles.

Beam splitting polarizers can be made at a low cost even if a crystal such as calcite is used, because of the sheet form of the polarizer which makes it possible to decrease consumption of the raw material. In addition, raw materials of lower quality may be used for the polarizer, as long as the material has good optical quality within a definite region. Furthermore, some optical birefringent plastics, such as Cellophane or SARAN wrap, after being specially treated by known techniques to increase their birefringence, can be used to manufacture the polarizers of this invention by known replication techniques. The cost of the polarizer will be very low as the result. Polarizers having a large aperture can be supplied in desired shapes.

The birefringence polarizing beam splitter of this invention may have a grating period in the range from submicron to hundreds of microns, as described above, and are composed of one or two substrates. They will normally be employed with incident monochromatic light, such as from a laser. The periodic triangle groove profile can be employed with incident radiation which is not monochromatic when the grating period is sufficiently larger than the wavelength of the incident light, because diffraction patterns then become almost independent of wavelength (for instance, when $d > 200\lambda$). In such cases, only the triangle groove pattern is applicable because in an echelon, if d is too large h must also be large. This design is difficult to manufacture by photolithography.

The foregoing disclosure and description of the invention are illustrative and explanatory thereof, and various changes in the details of the illustrated apparatus and construction and method of operation may be made without departing from the spirit of the invention.

What is claimed is:

1. A birefringence polarizing beam-splitter, comprising:
   an optically birefringent substrate having a first plane surface and having an optic axis parallel to the first plane surface, the substrate having a second surface and a series of grooves having a selected width in the second surface, the grooves having a blazed profile on the second surface of the substrate, the profile having a blazed angle and repeating so as to form a sawtooth pattern, the pattern repeating in a plane parallel to the optic axis of the substrate material.

2. The beam-splitter of claim 1 wherein the grooves have a width in the range from about 0.1 micron to about 800 microns.

3. The beam-splitter of claim 1 wherein the blazed angle is in the range from about 10° to about 50°.

4. The beam-splitter of claim 1 wherein the substrate material is a crystal.

5. The beam-splitter of claim 4 wherein the crystal is calcite.

6. The beam-splitter of claim 1 wherein the substrate material is a plastic.

7. A birefringence polarizing beam splitter, comprising:
   an optically birefringent substrate having a first plane surface and having an optic axis parallel to the first plane surface, the substrate having a second surface and a series of grooves in the second surface, the series of grooves having an echelon profile including a plurality of steps in each echelon, the steps being of equal width, height and number in each echelon and the profiles repeating so as to form an echelon array pattern, the pattern repeating in a plane parallel to the optic axis of the substrate.

8. The beam-splitter of claim 7 wherein the steps have a width in the range from about 0.1 micron to about 800 microns.

9. The beam-splitter of claim 7 wherein the steps have a height in the range from about one-tenth the wavelength of incident light to about ten-times the wavelength of incident light.

10. The beam-splitter of claim 7 wherein the substrate material is a crystal.

11. The beam-splitter of claim 10 wherein the crystal is calcite.

12. The beam-splitter of claim 7 wherein the substrate material is a plastic.

13. A birefringence polarizing beam-splitter, comprising:
    a first optically birefringent substrate having a refractive index for first and second directions of polarization and having a first plane surface and having an optic axis parallel to the first plane surface, the substrate having a second surface and a series of grooves in the second surface, the grooves having a selected width and a blazed profile on the second surface of the substrate, the profile having a blazed angle and repeating so as to form a sawtooth pattern, the pattern repeating in a plane parallel to the optic axis of the substrate material;
    a second optically birefringent substrate having the refractive index for the first and second directions of polarization and having a first plane surface and having an optic axis parallel to the first plane surface, the substrate having a series of grooves having a width in a second surface, the grooves having a blazed profile on the second surface of the substrate, the profile having a blazed angle and repeating so as to form a sawtooth pattern, the pattern repeating in a plane parallel or perpendicular to the optic axis of the substrate material, and the pattern of the first substrate and the pattern of the second substrate being the same, and the second substrate being placed such that the optic axis of the second birefringent substrate is disposed in a direction perpendicular to the optic axis of the first birefringent substrate, and the grooves of the second substrate are aligned opposite the grooves of the first substrate and proximate thereto so as to form an inner volume between the substrates.

14. The beam-splitter of claim 13 wherein the inner volume is filled by a medium having a refractive index value greater than the refractive index value of the substrate material for the first direction of polarization and less than the refractive index value of the substrate material for the second direction of polarization.

* * * * *